(12) United States Patent
Smith

(10) Patent No.: US 12,224,148 B2
(45) Date of Patent: Feb. 11, 2025

(54) ELECTRONICALLY ADDRESSABLE DISPLAY INCORPORATED INTO A TRANSMISSION MODE SECONDARY ELECTRON IMAGE INTENSIFIER

(71) Applicant: ELBIT SYSTEMS OF AMERICA, LLC, Fort Worth, TX (US)

(72) Inventor: Arlynn Walter Smith, Blue Ridge, VA (US)

(73) Assignee: ELBIT SYSTEMS OF AMERICA, LLC, Fort Worth, TX (US)

(*) Notice: Subject to any disclaimer, the term of this patent is extended or adjusted under 35 U.S.C. 154(b) by 845 days.

(21) Appl. No.: 17/222,582

(22) Filed: Apr. 5, 2021

(65) Prior Publication Data

US 2021/0335566 A1    Oct. 28, 2021

Related U.S. Application Data

(60) Provisional application No. 63/016,638, filed on Apr. 28, 2020.

(51) Int. Cl.
*H01J 31/50* (2006.01)
*H01J 1/34* (2006.01)
*H01J 9/233* (2006.01)

(52) U.S. Cl.
CPC ............... *H01J 1/34* (2013.01); *H01J 9/233* (2013.01); *H01J 31/50* (2013.01); *H01J 31/507* (2013.01); *H01J 2201/3423* (2013.01); *H01J 2231/50026* (2013.01); *H01J 2231/5016* (2013.01)

(58) Field of Classification Search
CPC ............. H01J 31/50; H01J 31/507; H01J 1/34
See application file for complete search history.

(56) References Cited

U.S. PATENT DOCUMENTS

| | | |
|---|---|---|
| 3,609,353 A | 9/1971 | White |
| 10,621,787 B2 | 4/2020 | Anderson |
| 2004/0189166 A1 | 9/2004 | Smith |
| 2008/0211652 A1 | 4/2008 | Cope et al. |
| 2010/0103267 A1 | 4/2010 | O'Rourke |
| 2011/0079715 A1 | 4/2011 | Nutzel et al. |

(Continued)

FOREIGN PATENT DOCUMENTS

WO    2019162574    8/2019

OTHER PUBLICATIONS

International Search Report and Written Opinion issued to PCT/US2021/028632, dated Sep. 17, 2021 11 pages.

(Continued)

*Primary Examiner* — Joseph L Williams
(74) *Attorney, Agent, or Firm* — Spencer Fane, LLP

(57) ABSTRACT

A night vision system along with an image intensifier tube and method for forming the tube are provided. The night vision system incorporates the image intensifier tube in both an analog channel as well as a digital channel, with an addressable display within the analog image intensifier tube analog channel configured to create an electronically addressable output. An analog image intensifier tube is included in the digital imager for presenting binary digital signals representative of an image, or of symbol indicia, and registering those digital representation from the digital imager onto one or more electron multipliers of the analog image intensifier tube within the analog channel. The provided night vision system also utilizes a cathodoluminescent screen, which is a highly efficient light source that reduces system power.

13 Claims, 8 Drawing Sheets

(56) References Cited

U.S. PATENT DOCUMENTS

2014/0125870 A1 5/2014 Kaplan
2018/0063516 A1 3/2018 Keesling et al.

OTHER PUBLICATIONS

Rejection Notice issued by the Japanese Patent Office in related JP Application No. 2022-565787, dated Nov. 21, 2023, 6 pages (English Translation included).
European Search Report issued to related EP Application No. 21796171.3, dated Jul. 10, 2014, 15 pages.

ELECTRONICALLY ADDRESSABLE DISPLAY INCORPORATED INTO A TRANSMISSION MODE SECONDARY ELECTRON IMAGE INTENSIFIER

PRIORITY CLAIM

The present application is based on, claims priority from, and is a continuation of Patent Application Ser. No. 63/016,638, filed Apr. 28, 2020, the disclosure of which is incorporated herein by reference in its entirety.

FIELD OF THE INVENTION

Example embodiments in general relate to night vision systems and, more particularly, image intensifier tubes and a method of manufacturing such tubes on a wafer fabrication and photolithography scale. The image intensifier tube comprises doped electron multipliers and addressable electron emitters that generate multiplied secondary electrons and addressed electron emissions from a backside surface of one or more transmission mode secondary electron (TMSE) image intensifiers shown as a display within the tube.

BACKGROUND

Night vision system such as night vision goggles typically include an image intensifier tube. The image intensifier tube, or "image intensifier", can include an electron multiplier arranged between a photocathode and a sensor anode. The photocathode detects infrared light in the form of photons from an object, and the image intensifier amplifies or multiplies the resulting photoelectrons, or "electrons", emitted from the photocathode. The multiplied electrons can be drawn to the anode, where they can be converted back to photons displayed on a screen. The anode or screen can include a sensor that upon receiving the increased number of electrons senses those electrons and produces an intensified representation of the image on the screen. The photocathode, the electron multiplier, and the anode is typically supported by a vacuum housing with gaps between the photocathode, electron multiplier, and sensor anode to provide gain and facilitate the flow of electrons therebetween.

Each of these devices within the vacuum tube can be classified as an analog image intensifier if the anode is an optical imager that converts electrons to photons displayed on a screen without any conversion to digital electrical signals (binary 1s and 0s) prior to display. Thus, an analog image intensifier tube is one having an analog channel of nighttime image intensification of low intensity infrared or near infrared radiation reflected from a target or object and received by a vacuum-sealed spaced photocathode, electron multiplier and phosphor-covered anode screen absent any conversion to a binary digital electrical signal in the interim.

Night vision based on analog image intensifiers have been in use for many years. In addition to the analog image intensifier, many night vision systems can also include a digital display to provide the users with situation awareness, symbology, and additional images of different wavelength modalities from a digital imager camera mounted on the night vision system. The additional data is provided from the digital imager camera as digital signal binary bits (binary 1 and 0 logic values) to an electronic digital display mounted on the night vision system. The electronic digital display produces an optical output image overlaid upon the optical output image from the analog image intensifier by an optical beam combiner configured within the night vision system. The beam combiner and the additional digital display consume power, increases the size/weight of the system, and adds complexity to the manufacturing of the night vision system.

The image from the analog image intensifier is generated as normal, except the output brightness is often increased to account for the transmission loss of a beam combiner. The beam combiner is used to combine the output optical image from the analog image intensifier with the output optical image from the digital display. The additional electronic digital display is generally fixed onto one surface of the beam combiner in a manner that provides the same focal distance as the output of the analog image intensifier on a separate channel of the beam combiner. If a secondary image from the electronic digital display is to be overlaid and coherently related to what is displayed on the analog image intensifier screen, then manufacturing complexity must be added to register the two images. The typical night vision system eyepiece must be designed to account for the additional distance of the beam combiner. The optical beam combiner adds size, weight and manufacturing complexity to the system. The analog channel size of the analog image intensifier is large compared to the digital channel size of the digital imager camera, causing a mismatch and allowing only limited overlay of the image from the digital display onto the image from the analog image intensifier.

SUMMARY

The present disclosure provides new and innovative night vision systems that create an electronically addressable display within the analog image intensifier tube itself. Symbology and images of the same or different wavelength modalities are sent to one or more semiconductor-based electron multipliers within the analog image intensifier tube. The symbols and images can then be added to the display output of the analog image intensifier tube without adding size and weight to the overall night vision system. The present night vision system also utilizes a cathodoluminescent screen, which is a highly efficient light source that reduces system power.

In accordance with at least one example of the disclosure, a night vision system is provided. The night vision system comprises an analog image intensifier, interchangeably an analog image intensifier tube, and an addressable display within the analog image intensifier. The addressable display is configured to receive electrical signals from an external digital imager to create an electronically addressable output from the analog image intensifier.

In accordance with another example of the disclosure, the night vision system includes a digital imager configured to receive an optical image from a target or object. The digital imager is configured to produce a plurality of electrical signal bits for each pixel corresponding to the optical image being displayed through a transparent anode sensor screen of the analog image intensifier. The analog image intensifier tube is configured to receive the optical image and to produce multiplied electrons from an electron multiplier within the analog intensifier tube. The analog image intensifier tube can also produce electrons from electron emitters on the electron multiplier that are addressed on a pixel-by-pixel basis corresponding to the plurality of electrical signals.

In accordance with yet another example of the disclosure, an image intensifier tube is provided. The image intensifier tube is preferably an analog image intensifier tube that forwards multiplied and gained electrons to a phosphor-covered screen that displays those converted electrons absent any conversion to digital electrical signals in the interim. The image intensifier tube, according to this example, comprises a photocathode secured to a vacuum sealed housing. The image intensifier tube can also include a primary electron multiplier spaced from the photocathode within the vacuum sealed housing, wherein the primary electron multiplier comprises a backside surface facing away from the photocathode and containing a first plurality of spaced electron emitters dielectrically spaced from respective first plurality of doped regions.

The image intensifier tube can also include a secondary electron multiplier spaced from the primary electron multiplier within the vacuum sealed housing. The secondary electron multiplier comprises a backside surface facing away from the primary electron multiplier and containing a second plurality of spaced electron emitters dielectrically spaced from respective second plurality of doped regions. The image intensifier tube further comprises a sensor anode secured in the vacuum housing, along with the secondary electron multiplier, the primary electron multiplier, and the photocathode. The sensor anode can include a phosphor covered fiber optic screen, for example.

In accordance with yet another example of the disclosure, a method is provided for manufacturing an image intensifier tube. The method comprises bonding a GaAs epitaxially grown wafer to a glass wafer to form a faceplate wafer. A backside of a primary doped silicon wafer can also be bonded to a primary glass spacer wafer to form a primary electron multiplier wafer. A backside of a secondary doped silicon wafer can be bonded to a secondary glass spacer wafer to form a secondary electron multiplier wafer. A fiber optics screen wafer can be bonded to a tertiary glass wafer to form a sensor anode wafer. The primary electron multiplier wafer, the secondary electron multiplier wafer and the sensor anode wafer can then be hermetically sealed within a vacuum along with the faceplate wafer. The faceplate wafer, the primary electron multiplier wafer, the secondary electron multiplier wafer and the sensor anode wafer are spaced from each other with a vacuum gap therebetween. Once hermetically sealed, the faceplate wafer, the primary electron multiplier wafer, the secondary electron multiplier wafer and the sensor anode wafer are altogether simultaneously diced along a seal member arranged in the scribe line. Scribing or dicing along the seal member between the faceplate wafer and the primary electron multiplier forms a first cavity. Scribing along a seal member between a primary electron multiplier wafer and the secondary electron multiplier wafer forms a second cavity. Scribing along a seal member between the secondary electron multiplier and sensor anode wafer forms a third cavity. The first, second and third cavities are gaps that are evacuated less than one atmosphere during hermetic sealing within a vacuum. A resulting die, for example, can be mounted behind an objective lens as the analog image intensifier tube. Alternatively, the resulting die can be mounted behind another objective lens as part of the digital imager. Since each die is identical, the analog channel dimension of the analog image intensifier tube is the same size as the digital channel dimension of the digital imager. Thus, the digital imager display output is overlaid upon and across the entire analog image intensifier display output using addressable electron emitters within the analog image intensifier tube display.

BRIEF DESCRIPTION OF THE DRAWINGS

Examples of the present disclosure are best understood from the following detailed description when read in connection with the accompanying drawings. According to common practice, the various features of the drawings are not drawn to scale, or are only shown in partial perspective. The dimension of the various embodiments are shown arbitrarily expanded or reduced for clarity. Like numerals are used to represent like elements among the drawings. Included in the drawings are the following features and elements, and reference will now be made to each drawing in which.

DETAILED DESCRIPTION OF EXAMPLE EMBODIMENTS

Figure 1:
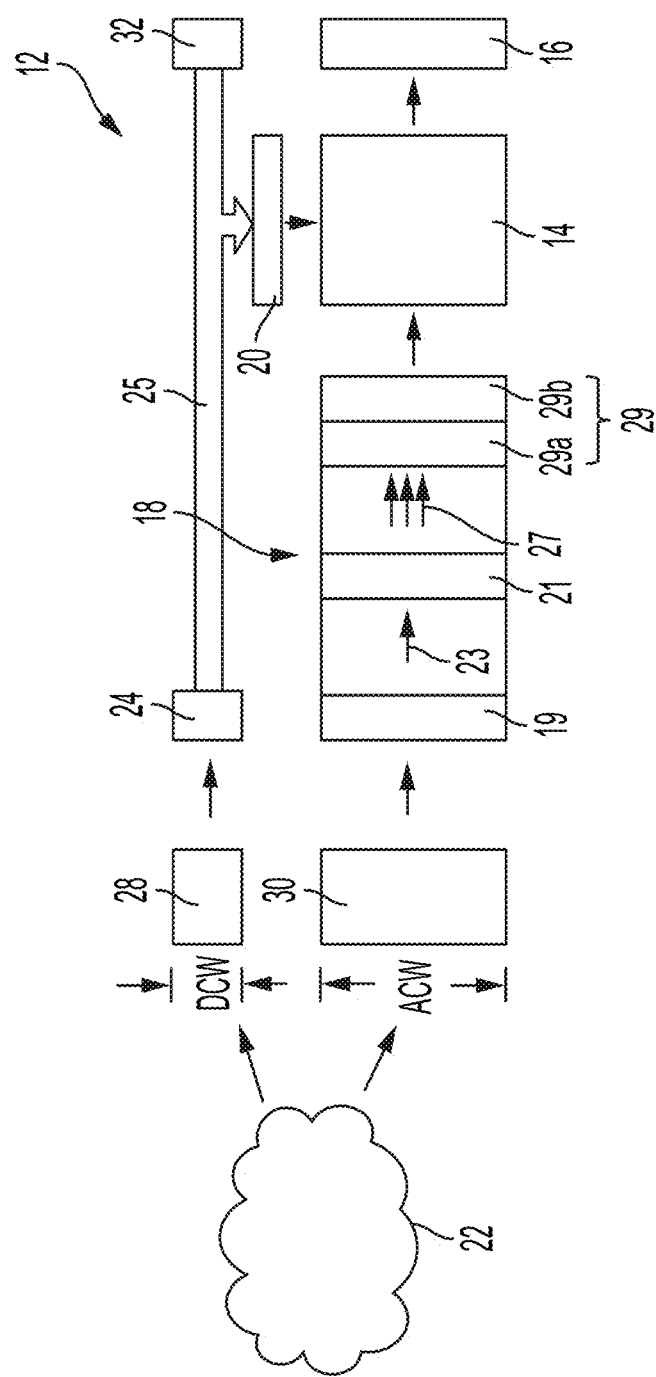
FIG. 1 is a partial block diagram of a night vision system having a beam combiner that combines an output optical image of a digital display overlaid upon an output optical image of an analog image intensifier.

The following discussion is directed to various example embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

As noted above, the drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

Referring now to FIG. 1, a partial block diagram of a night vision system 12 is shown having a beam combiner 14. Night vision system 12 is illustrated of the current technology for performing an optical overlay. Beam combiner 14 sends to the display 16 both the output of an analog imager intensifier 18 and also an output from a digital electronic display 20. Night vision 12 thereby proves advantageous in that an image of an object 22 can be taken both by a digital imager camera 24 and an analog image intensifier 18. Image from an object or target 22 can be passed through lenses 28 and 30, and then onto respective digital imager camera 24 and analog image intensifier 18.

In some circumstances needed to enhance a soldier's vision in finding and localizing threats, digital images must be taken, along with analog images normally associated with low light level night vision viewing. While digital imager 24 typically cannot match the performance of an analog image intensifier tube 18 at extremely low light levels, digital imagers can be used to display information to a soldier about the scene in front of that soldier, such as directions or other symbol indicia, about the scene or image object 22. In addition, the digital imager 24 can take other imaging modalities, including sensitivities to different wavelengths, such as LWIR for thermal imaging of object 22 rather than SWIR or NWIR imaging sensitivity that might occur in the analog image intensifier tube 18. The sensor within the digital imager 24 can therefor pickup different wavelengths than the sensor within the analog image intensifier tube 18, or can produce symbol indicia on the overlaid scene of the combined optical images via a controller 32. The image from the digital imager 24, or the indicia from the controller 32 arrives on the digital display 20 as digital electrical signals on bus 25. Those electrical signals are converted to optical signals, or optical images, that are combined with the optical image from analog image intensifier 18 by beam combiner 14.

Figure 2:
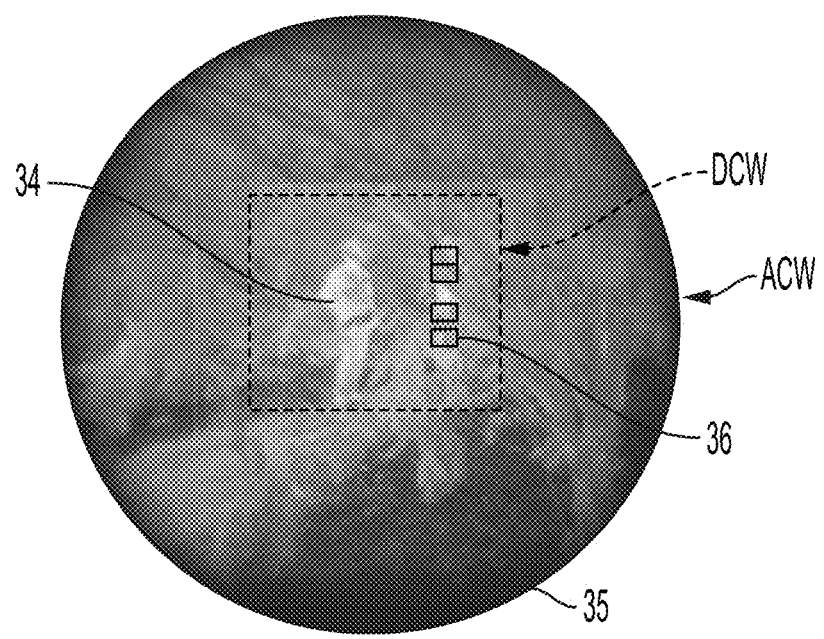
FIG. 2 illustrates an output image of a digital display overlaid upon an output image of the analog image intensifier utilizing the night vision system of FIG. 1.

As shown in FIG. 1, the channel width, or dimension, of the image capture at which digital imager 28 can accommodate is referenced as DCW. DCW is typically less than the channel width, or dimension, of the analog channel ACW. This is evident in the output image of the combined display 16 of FIG. 1, as shown in FIG. 2. FIG. 2 illustrates the difference in the DCW versus ACW of an output image of a digital display overlaid upon an output image of an analog image intensifier tube utilizing the night vision system of FIG. 1. For example, the digital imager camera 24 in FIG. 1 could superimpose a thermal image output of a soldier 34 that may not be detectable by the low light detection of an analog image intensifier 18 output 35. Still referring to the combination of FIGS. 1 and 2, controller 32 may send a plurality of electrical signals representing a symbol 36 onto digital electronic display 20. The digital display output 34, which can also include symbol 36, can be overlaid onto the analog image intensifier output 35 by beam combiner 14.

Figure 3:
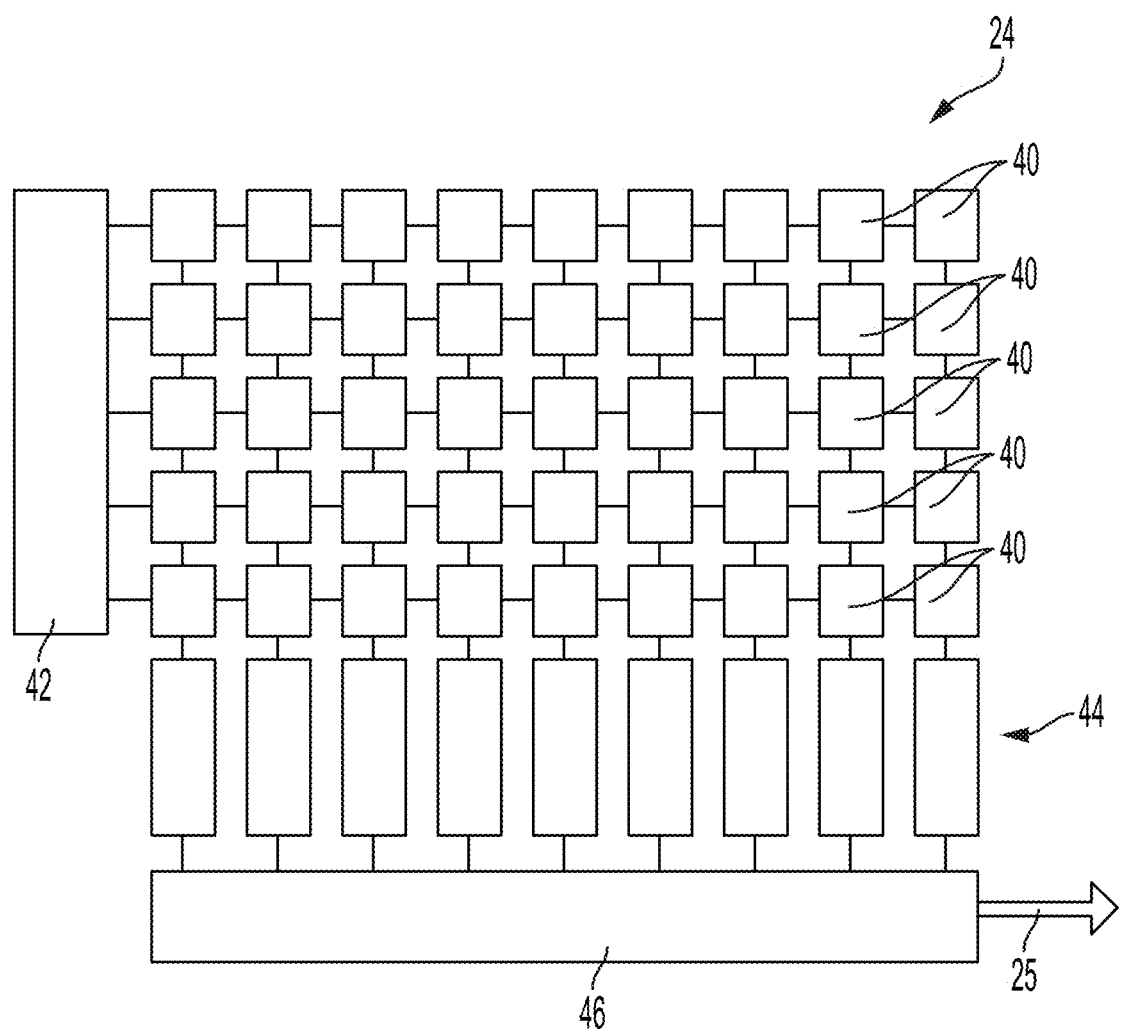
FIG. 3 illustrates a digital display sensor device, or digital imager, and specifically an active pixel sensor device within a backend portion of the digital imager camera that produces a digital output signal to the electronic display so the electronic display can produce an output optical image for optical overlay by the beam combiner of FIG. 3.

Referring to FIG. 3, a digital imager camera or display sensor device 24 of FIG. 1 is shown. Digital sensor 24 is used in many night vision systems to allow display and viewing, recording, and other image processing including fusion with other imagery such as from a forward looking infrared sensor within, for example, an analog image intensifier tube 18. Image sensing devices that incorporate an array of image sensing pixels 40 are commonly used in electronic cameras. Each pixel produces an electrical output signal in response to incident light or photons. The electrical signals are oftentimes read out, typically one row at a time, to form an image. Digital imager cameras 24 can use charged coupled devices (CCDs) as the pixelized image sensor. For example, the pixel array 40 can be controlled by a timing and control circuit 42, and the signals can be processed by processors 44, which may comprise analog-to-digital converters arranged on each column as the signals are read out by a column select unit 46. The electrical signals corresponding to each pixel output can be then placed on a bus 25.

The array of pixels 40 can be a photodiode type pixel structure. When reverse biased, current will flow through the photodiode with incident light creating photocurrent. Depending on the photodiode bias to a drain voltage, a photogenerated charge current is produced, and the charge can be amplified by a source follower transistor and sense unit within the analog processing portion of the analog-to-digital output structures 44. Depending on the magnitude of the sensed analog signal, a binary bit value of logic 1 or logic 0 can be created and placed on bus 25. Digital sensor imagers 24 that incorporate an amplifier into each pixel for increased sensitivity are known as active pixel sensors. Moreover, digital imaging sensor 24 can either be implemented as a CCD, or a combination of p-type transistors and n-type transistors utilizing CMOS fabrication technology as a CMOS sensor. Most modern-day digital imaging sensors use a CMOS sensor chip, or die, to perform the photon or electron sensing. Regardless of whether a CCD or CMOS device is used by digital sensor 24, a plurality of electrical signals are sent on bus 25 representative of the image or symbol to address a digital display 20 for thereafter emitting light from the corresponding pixel(s). When the electrical signals on bus 25 cause an array of diodes in display 20 to forward bias, light is emitted from those diodes on pixel-by-pixel bases as electrical energy is converted to light or photons that are then combined in beam combiner 14.

Referring back to FIG. 1, analog image intensifier tube 18 is beneficial over images generated by digital imager 24, in that tube 18 can generate high quality images over a wide range of light levels, including extremely low light levels such as those encountered under starlight. Night vision system 12 utilizing analog image intensifier 18 are fairly well known, and based on Generation-III (GaAs photocathode) or Generation-II (multi-alkali photocathode) image intensifier fiber that can be thereafter optically coupled to a CCD or CMOS sensor device to form an image intensified low light level camera.

Image intensifier 18, however, is an analog image intensifier. Analog image intensifier 18 produces an analog image onto beam combiner 14, and does not convert that image to a digital electrical signal representation thereof. The analog image is produced on the eyepiece 16 directly, without any photon to electrical signal conversion within the image intensifier tube itself. The image produced from analog image intensifier 18 is not a plurality of binary 1s or 0s as in the digital sensor 24 output. Instead, analog image intensifier 18 produces multiplied and gained electrons converted to photons and displayed through a transparent fiber optic screen, for example.

Analog image intensifier 18 begins with a photocathode, such as a transmission photocathode 19. Photocathode 19 may comprise a faceplate made of glass and coated with GaAs on a backside surface of the faceplate 19 facing an electron multiplier 21. Other type III-V materials can be used such as GaP, GaIn, AsP, InAsP, InGaAs, etc. Alternatively, the photocathode 19 may be known as a Bi-alkali photocathode. Photoemissive semiconductor material of photocathode 19 absorbs photons. The absorbed photons of the optical image arriving on the faceplate of photocathode 19 causes the carrier density of the semiconductor material to increase, thereby causing the material to generate a photocurrent of electrons 23 emitted from the backside surface of photocathode 19. According to one example, a semiconductor wafer may have GaAs epitaxially grown on a frontside surface of the wafer, and the backside surface thereafter thinned, and then bonded to the glass faceplate so that the GaAs epitaxially grown surface faces the electron multiplier 21. Alternatively, the semiconductor structure may be another type of semiconductor material other than silicon that contains epitaxially grown GaAs. That alternative semiconductor structure can be GaAs itself.

Image intensifier tube 18 utilizes photocathode 19, according to one example, for conversion of non-visible light sources such as near infrared or short wave infrared to visible. In many image intensifiers, the electrons emitted from photocathode 19 are accelerated towards a transparent anode coated with phosphor, such as electron sensing anode 29. The electrons that strike the phosphor with high energy can cause the phosphor coating 29a on anode 29 to generate photons. The emitted photons are directed by optics, such as a fiber optic bundle 29b, directly to an eyepiece. The combination of the phosphor coating and fiber optic bundle are shown as 29a and 29b, respectively. The phosphor coated fiber optic screen, or sensor anode 29, is vacuum sealed within the analog image intensifier 18. The fiber optic taper or transfer lens within the fiber optic unit 29b transfers the amplified visual image via beam combiner 14 to the eyepiece 16 for viewing by the user.

Figure 4:
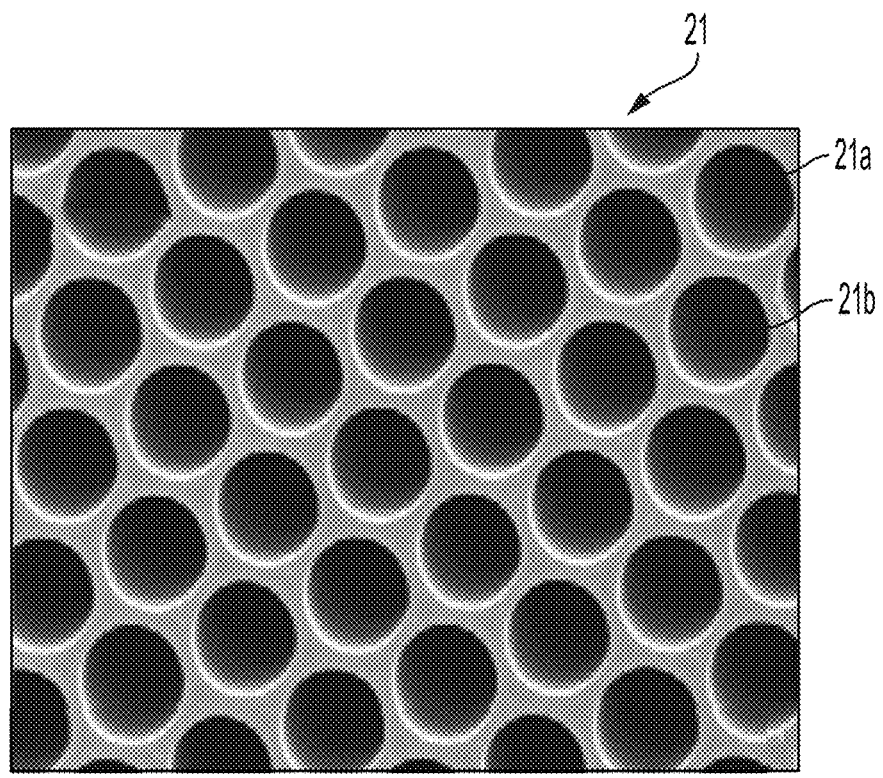
FIG. 4 is a backside image of a microchannel plate (MCP) conventional electron multiplier, showing insufficient surface area for mounting electron emitters and control circuitry between the array of tube openings of the MCP.

In the existing analog image intensifiers 18, there are numerous interfaces in which the image is sampled, and image degrades and adds noise to the incoming optical signal. This image degradation and reduction in resolution is disadvantageous in night vision systems 12 that require high quality output. To offset the image degradation resulting from the multiple optical interfaces in the image intensifier 18, a microchannel plate (MCP) electron multiplier 21 is oftentimes used. The MCP type electron multiplier receives the electrons 23 that are focused onto it by the photocathode 19, and the MCP-type electron multiplier intensifies the electron image by producing secondary multiplication of those electrons at the output thereof, as shown by reference numeral 27. Although MCP-type electron multiplier 21 applies gain or amplification to the image intensifier 18, and while an MCP-type electron multiplier maintains the geometric integrity of the incoming image, MCP's are relatively noisy as an electron amplifier. The added noise can degrade the low light level image quality. Moreover, due to the density by which each MCP channel opening must be placed near the adjoining MCP channel opening, the backside surface of an MCP 21, as shown in FIG. 4, has little if no room for mounting anything else on that backside surface between openings 21a and 21b, for example.

Alternatively, a doped electron multiplier must be used herein instead of an MCP. A doped electron multiplier not only produces the necessary multiplication and electron gain, but also have sufficient area on its backside surface to accommodate electron emitters of the Spindt type. The emission areas on the backside surface of the doped electron multipliers, between doped regions thereof, are activated to a negative electron affinity (NEA) state to facilitate the flow of electrons from the backside emission surfaces. Still further, in the regions between multiplied electron emission areas of the doped electron multiplier an array of electron emitters can be placed along with circuit actuators needed to activate those emitters on a pixel-by-pixel basis, each of which are selected by the digital signals providing across a bus 55 from an improved digital imager 54 shown in FIG. 6.

Figure 5:
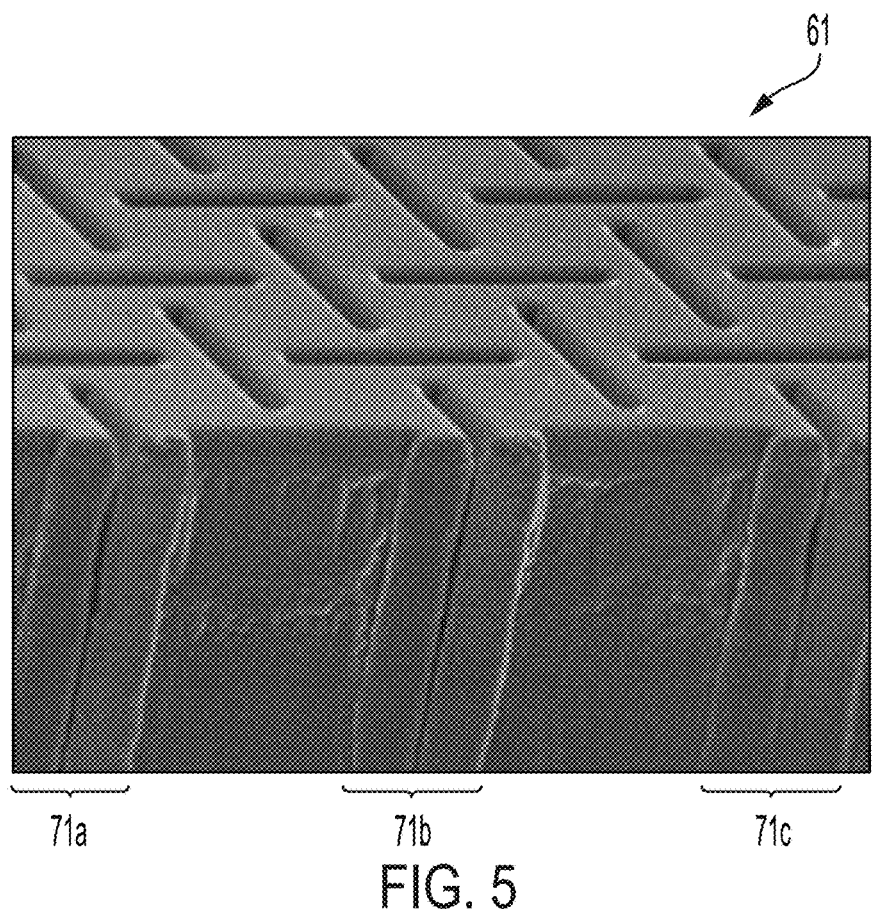
FIG. 5 is a backside image of a doped electron multiplier, or transmission mode secondary electron (TMSE) multiplier, before electron emitters and control circuitry is placed between multiplied electron emission areas.

FIG. 5 illustrates the backside surface, taken in profile, of a doped semiconductor electron multiplier 61. Since this is a backside surface illustration, the multiplied electrons will extend vertically upward from the page as they emit from the backside surface between doping regions 71 (shown as regions 71a, 71b, 71c, etc.). FIG. 5 illustrates the backside surface of a doped semiconductor electron multiplier 61 prior to the addition of Spindt-type electron emitters and gate circuitry that are printed and diffused on and into that backside surface as will be described in further detail in FIG. 9. FIG. 5 is presented to illustrate the sufficient real estate on the backside surface needed to add the electron emitters and control circuitry that is not available in the MCP-type electron multiplier 21 backside surface. Accordingly, the present embodiments utilize a doped semiconductor electron multiplier rather than an MCP-type electron multiplier between the photocathode and the sensor anode of an image intensifier tube that forms the analog image intensifier and, as will be discussed below, part of the digital imager 54.

Figure 6:
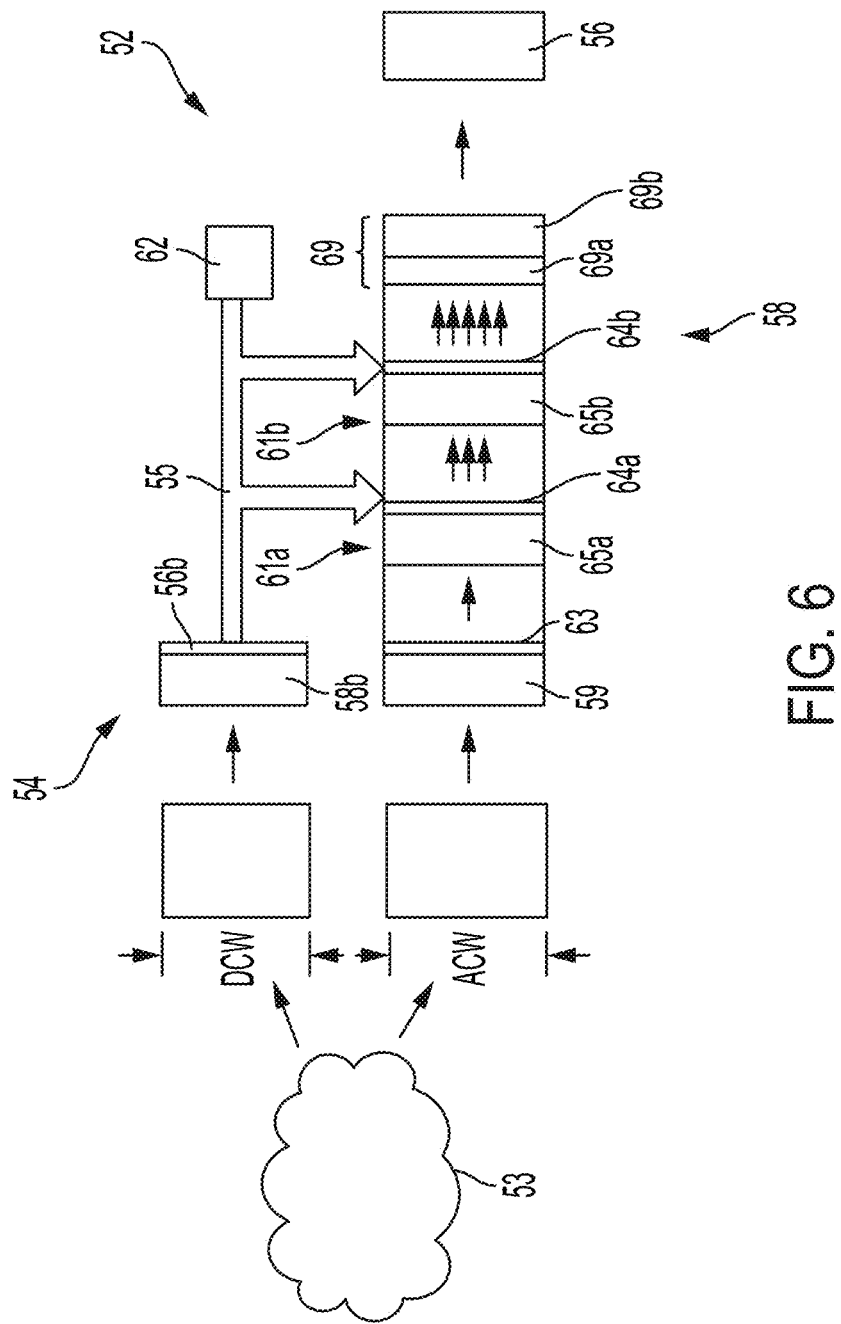
FIG. 6 is a partial block diagram of an improved night vision system that does not use a beam combiner, and instead incorporates addressable electron emitters on the backside surface of one or more doped electron multipliers, or TMSEs, within an analog image intensifier tube.

Turning now to FIG. 6, an improved night vision system 52 is shown in block diagram. The improved night vision system 52 according to the present disclosure does not utilize a beam combiner 14 or a digital electronic display 20 as noted in the night vision system 12 of FIG. 1. Night vision system 52 nonetheless combines an addressable display within analog image intensifier 58 onto eyepiece 56. Instead of combining or overlaying an image derived from a digital display with an image derived from an analog image intensifier 58 using a beam combiner, electrical signals from digital imager 54 are sent across an electrical bus 55 onto at least one and preferably two electron multipliers 61a and 61b. Any symbology from controller 62 are also represented as binary bits and also sent as 1s and 0s across bus 55 onto the primary and secondary electron multipliers 61a and 61b, respectively.

Image intensifier 58 of FIG. 6 includes a photocathode 59 comprising a glass faceplate onto which a GaAs semiconductor die, or epitaxially grown GaAs on silicon die, is bonded to a backside surface, shown as reference numeral 63. On the backside surface of the primary electron multiplier 61a is a semiconductor die having an array of electron emitters, as shown by reference numeral 64a. On the backside surface of secondary electron multiplier 61b can be an array of electron emitters formed also on a semiconductor die, as shown by reference numeral 64b. The conductive traces of electrical bus 55 are connected to printed conductors that are routed through gating logic to the array of electron emitters 64a and 64b. The array of electron emitters within the primary and secondary electron multipliers 61a and 61b are identical to one another and have the same spacing and are in alignment with one another.

On the frontside surfaces of the primary and secondary electron emitters 61a and 61b are optically transparent glass plates 65a and 65b. As noted herein, a frontside surface is a surface that faces towards the photocathode 59, whereas a backside surface is a surface that faces towards the sensor anode 69. Anode 69 can include a frontside surface of a transparent glass spacer die 69a, and a backside region of a fiber optic bundle or lenses 69b. The transparent glass spacer die 69a can be coated with phosphor to direct the photons light converted by the phosphor toward the eyepiece 56. Primary electron multiplier 61a multiplies electrons using the doped semiconductor regions therein, and sends the multiplied electrons from a plurality of electron emission regions arranged pixel-by-pixel to corresponding pixelated emission regions in the secondary electron multiplier 61b, where the electrons are further multiplied to provide multiple electron gain and amplification onto the phosphor screen of sensor anode 69.

The electron emitter are also arranged on the backside surfaces of the primary and secondary electron multipliers 61a and 61b so that each electron emitter is adjacent to a corresponding electron emission region. In this fashion, the electrons emitted from each emitter can be electrically addressed by control circuitry corresponding to that emitter. The control circuitry is actuated with a digital number corresponding to a set of binary 1s and 0s sent on bus 55. The digital number can be converted to a corresponding analog value by the control circuitry having a digital to analog converter (DAC), and that analog voltage is applied to a pixel control gate. Within digital imager 54 is preferably another (second) analog image intensifier tube 58b. Image intensifier tube 58b is preferably identical to image intensifier 58. At the backside of the image intensifier 58b is a digital sensor 56b mounted on or separate from the backside surface of image intensifier tube 58b. The digital sensor 56b comprises a plurality of active or passive pixel sensor devices arranged in an array operating as optical pixels with CMOS circuitry to convert the photons emitted from image intensifier 58b to electrical signals, similar to the pixel array 40 shown in FIG. 3. Digital sensor 56b can be a CMOS imager used as an active pixel sensor device or passive pixel device. Digital sensor 56b can be a CMOS imager chip or die with integrated amplifiers as an active pixel sensor device that incorporates both the photodiode and a read out amplifier.

Since the image intensifier tubes 58 and 58b are the same and have the same chip or die size, the improved night vision system 52 of FIG. 6 has a digital channel dimension or width DCW that matches the analog channel dimension or width ACW. Thus, the channel opening into the digital imager 54 is equal to the channel opening into the analog image intensifier 58. As seen by a viewer when looking at the object 53, the viewer will see the digitally derived image overlaid across the entire field of view of the analog derived image. Referring back to FIG. 2, the DCW will extend outward equaling the field of view of ACW. However, the image viewed by the DCW can be of a different wavelength or contain different image modalities and symbols that may not be viewable by the ACW field of view seen by a user. Expanding the field of view of the DCW corresponding to the ACW not only provides the user with a more robust viewing experience, but provides more information at different image modalities and symbol indicia for a safer viewing experience. For example, the LWIR modality detectable by the digital imager 54 is displayed across the entire field of view (in both height and width) of the analog image intensifier tube 58, and not just a small portion thereof.

The improved night vision system 52 of FIG. 6 thereby eliminates the weight and enhances the overall system transmission efficiency over conventional designs. The space requirements and physics of current MCP-type electron multipliers also do not lend themselves to the incorporation of data from outside source to the conventional beam-combiner integral display. The present night vision system 52 uses wafer scale photolithography and the physics of electron bombarded gain and negative electron affinity (NEA) at the emission areas between doped regions of the silicon surfaces. Night vision system 52 advances the performance of analog night vision in both signal-to-noise ratio, modulation transfer function (MTF) with an associated power reduction. The added capability of incorporating external digital signals and binary 1s and 0s information is achievable on not just one but on two or more electron multipliers. Of benefit is the electrical signals sent to electron emitters on the backside surfaces of the electron multipliers. It is desirable that the digital electrical signals on bus 55 be sent to the electron multipliers instead of, for example, the backside surface of a photocathode. One advantage is the emission from the electron emitters on the primary electron multiplier will be further amplified or multiplied downstream on the secondary electron multiplier. The emission surfaces from two backside surfaces are also identical across the arrays of each and in registration with both backside surfaces. If the emitters are placed on the backside surfaces of the photocathode, the GaAs or other III-V materials of the photocathode backside are not of a semiconductor, photolithography-defined silicon surface. Silicon microfabrication is more readily achieved compared to any microfabrication into GaAs surface. Moreover, the GaAs backside surface of a photocathode is far too sensitive to residual gases in the vacuum than silicon. It is therefore desirable to minimize any current emitted from the GaAs photocathode backside because emitted electrons tend to ionize the residual gas. The ionized gas is of opposite charge compared to the electron so as to draw back the electrons to the photocathode backside by the internal field. Any backscattering of the ion to the GaAs of the photocathode tends to poison the surface, thereby decreasing its NEA capability. Thus, for the above reasons as well as others, it is far more desirable to incorporate the external digital signals upon the electron multipliers and not upon the photocathode.

The improved night vision system 52 not only incorporates external electrical digital signals to each electron emitter, but also allows electron emitters at each pixel to utilize the existing phosphor 69a for integral light generation. A digitally injected image can be correctly overlaid onto the intensified scene within the vacuum envelope of the image intensifier tube 58. The improved night vision system 52 incorporates a second image intensifier tube 58b onto the digital imager to improve the performance of the digital imager 54. The present digital imager 54 can match the low illumination light level performance or temporal response of image intensifier tubes, and can display more information to the user than just the scene in front of that user. This information can include directions (e.g., symbols) or other imaging modalities and image wavelengths onto the analog image intensifier 58. Already present optically transparent screens 69b of an image intensifier tube 58 can be used to display digital data from other sensors such as sensor 56b or other digital symbology of binary 1s and 0s from controller 62. The digital imager of the improved night vision system 52 also incorporates a wider and greater display area to incorporate symbology and other information to the entire field of view offered by the analog image intensifier tube 58. The predominate reason for the wider display is that digital imager 54 incorporates an analog image intensifier tube 58b that is similar to the analog image intensifier tube 58, and of the same chip or die size for each. Moreover, the photon-to-electron conversion into tube 58b matches that in tube 58, and the tubes of each have one and preferably two electron multipliers for added low illumination performance.

Figure 7:
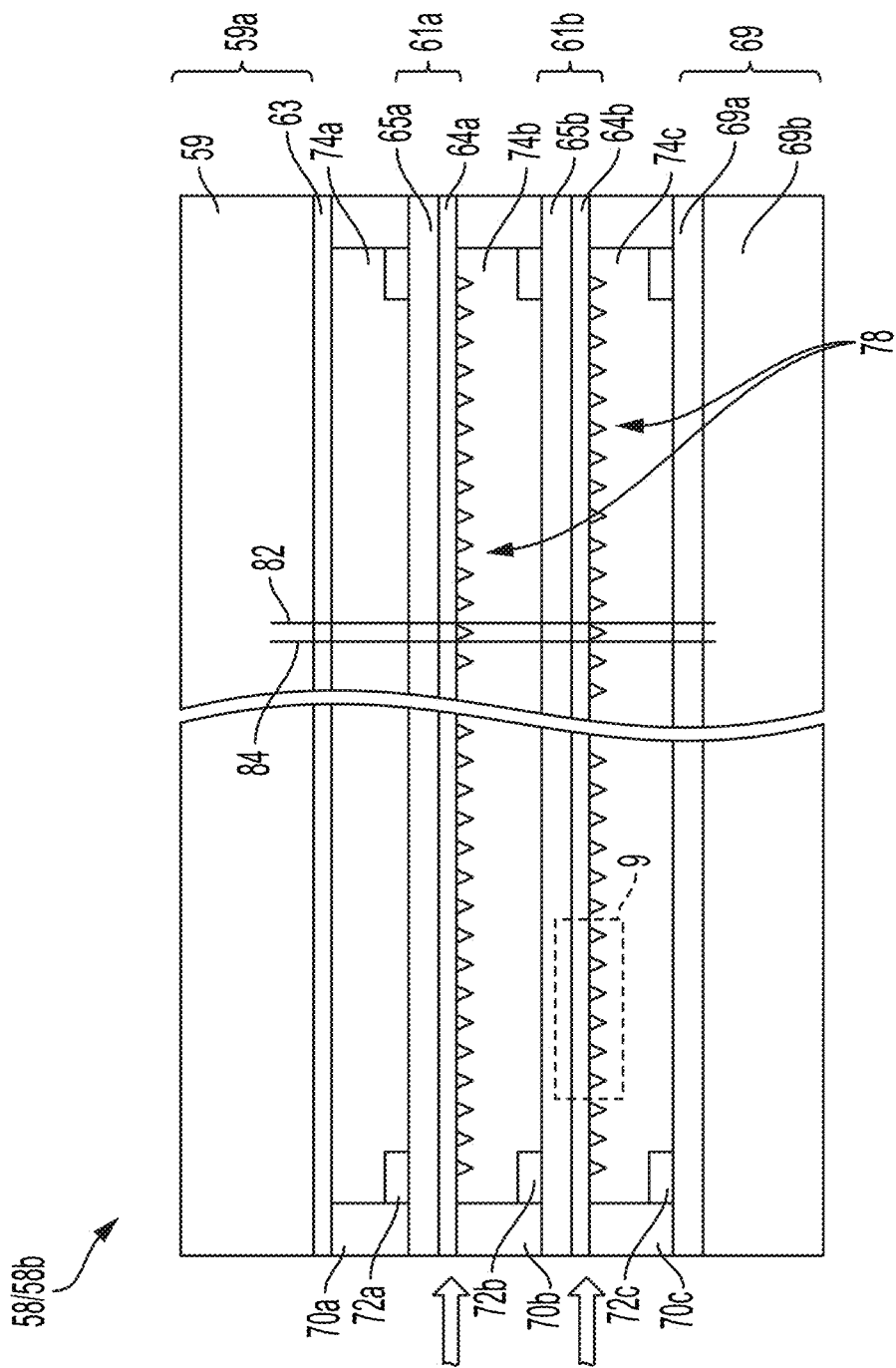
FIG. 7 is a side view of the analog image intensifier tube of FIG. 6.

Turning now to FIG. 7, a side view of the analog image intensifier tube 58 or 58b in FIG. 6 is shown. Since tube 58b is the same as tube 58, the reference numerals in tube 58 will also be applicable to those in tube 58b, and those reference numerals are taken from FIG. 6 illustrating tube 58. It is important to note, however, the same items within analog image intensifier tube 58 are also in the analog image intensifier 58b within the digital imager 54 of FIG. 6. Referring back to FIG. 7, a photocathode within the analog image intensifier tube 58/58b comprises a faceplate 59 having one surface directed towards the object being imaged, and the opposing surface having GaAs material thereon. GaAs material can be in a form of an epitaxially grown GaAs material, or can be GaAs semiconductor body. As noted above, other III-V materials can be used for item 63 on the backside surface of faceplate 59. A seal member 70a can be arranged between GaAs material 63 and a glass spacer 65a. Getter material 72a can be placed on spacer 65a and adjacent to seal member 70a. Seal member 70a can be deposited using various semiconductor fabrication techniques, or through electroless plating, electro-deposition or various combinations thereof. Seal member 70a, as well as seal members 70b and 70c, as shown in FIG. 7, can be made of one or more layers of metallic materials such as copper, gold, lead, tin, aluminum, platinum, or other suitable material or combinations of material that can provide a good wetting surface for solder.

Referring to another embodiment, the seal members 70a, 70b, and 70c may be made of non-metallic material, such as glass, frit, ceramics or other combinations of non-metallic substances. The seal mechanism is performed by compression, thermocompression, or by other techniques that seal against ingress/egress of any substance or molecules into vacuum gaps 74a, 74b and 74c. The vacuum gaps 74a, 74b and 74c are caused by hermetically sealing via seal member compression electron multipliers 61a and 61b a spaced distance between the photocathode 59a and the sensor anode 69. The photocathode 59a comprising a faceplate 59 and a backside coating material 63, whereas the sensor anode 69 comprising a phosphor material 69a on the frontside surface of a fiber optic screen 69b.

The vacuum sealed cavities, or gaps 74a, 74b and 74c, can contain getter material 72a, 72b and 72c within that internal cavity. The getter material 72 is used to maintain a target vacuum level inside those cavities. Using a seal member for hermetically sealing electron multipliers 61a and 61b between the photocathode 59a and anode 69 within a vacuum housing can suffer from a high leak rate when a single vacuum pumped structure occurs. Getter material 72 is applied as a coating to a surface adjacent to spacer members 65a, 65b and 69a. When activated through the evacuation process and/or when combined with thermal energy, the getter material 72 can remove gases to maintain the vacuum level within the spaced gaps or cavities 74. Removal or maintenance of the vacuum is described herein as "getter pump or getter pumping." The getter material within the vacuum continually removes residual gas as it is produced, often achieving a higher vacuum than the pump could achieve alone during the seal process.

The digital sensor 56b is spaced from or coupled to a backside of the analog image intensifier tube 58b. The digital imager 54, and specifically, the CMOS digital sensor 56a sends the electrical signals corresponding to the optical readings on the pixel array to the backside surfaces 64a and 64b of corresponding primary and secondary electron multipliers 61a and 61b. The electrical signals are sent to addressable electron Spindt emitters on the backside surfaces 64a and 64b. The electron emitters can be electrically conductive protrusions 78 printed as an array of protrusions using conventional semiconductor photolithography and deposition techniques across the backside surfaces. Surrounded by and coupled to each protrusion 78 is actuating circuitry that couples to the bus 25 to receive a corresponding electrical signal. Depending on whether the logic value is binary 1 or binary 0, an emitter protrusion 78 will emit electrons or not. Each electron emitter 78 emits electrons from the backside surface of an electron multiplier 61a or 61b between a pair of spaced emission surfaces from which multiplied electrons are emitted toward the sensor anode 69.

The analog image intensifier tube 58 and 58b can be simultaneously formed from a series of bonded, spaced, and sealed wafers. The wafers consist of glass spacer wafers bonded to an appropriate processed silicon wafer, with seal members and getter members spaced between bonded wafers near the scribe line. The seal member 70 is configured around each individual die or chip to be formed so that, when sealed, a die or chip results having primary and secondary electron multipliers 61a and 61b sealed in vacuum from each other and between photocathode 59a and anode 69.

Since primary electron multiplier 61a comprises a scribed semiconductor wafer die 64a that is identical to scribed semiconductor wafer 64b of the secondary electron multiplier 61b, each electron emitter 78 in one electron multiplier 61b is aligned with the corresponding electron emitter 78 in the other electron multiplier 61a. More specifically, there are a plurality of emitter axes 82 extending through the central portion of each emitter protrusion 78, with a center of emitter protrusion 78 within the primary electron emitter 61a aligned along that same axis with a center of emitter protrusion 78 within the secondary electron multiplier 61b. The emitter axis 82 is shown parallel to and spaced from an emission axis 84. The emission axis shows alignment between the multiplied electron emission areas of the primary and secondary electron multipliers 61a and 61b. Of course, the number of emitter axes 82 corresponds to the number of paired electron emitters within each of the primary or secondary electron multipliers 61a and 61b. The emitter tip of emitter protrusion 78 will extend through that axes and is centered on that axis 82.

The emission axis 84 is spaced from a corresponding emitter axis 82, parallel to the adjacent to a corresponding emitter axis 82. The combination of the emitter axis 82 and the emission axis 84 comprise the pathway at which electrons are emitted as a single pixel for display. By forming the image intensifier tube through vacuum spaced bonding of processed silicon wafers to corresponding glass spacer wafers, and thereafter separating vacuum-sealed die or chips, the electron emission surfaces of a corresponding pixel will be aligned along axis 84, and the electron emitter protrusion surfaces will be aligned along axis 82 so that misalignment or blurring of resolution at the pixel level cannot occur. The DCW and ACW is confined to be the same size and a product of only the photolithography scale, which is much less than the format normally used in conventional beam combiners, where the ACW must be 18*mm* or larger in height and width. Still further, the present image intensifier 58 or 58*b* produces gain on the electron multipliers 61*a* and 61*b* while incorporating an electronically addressed display in those multipliers. Each electron multiplier 61*a* and 61*b* is identical and uses negative electron affinity membranes in place of the conventional MCP used in most current image intensifiers. The electron multiplier device is based on MEMS processing and wafer scale technology as further illustrated in FIG. 8.

Figure 8:
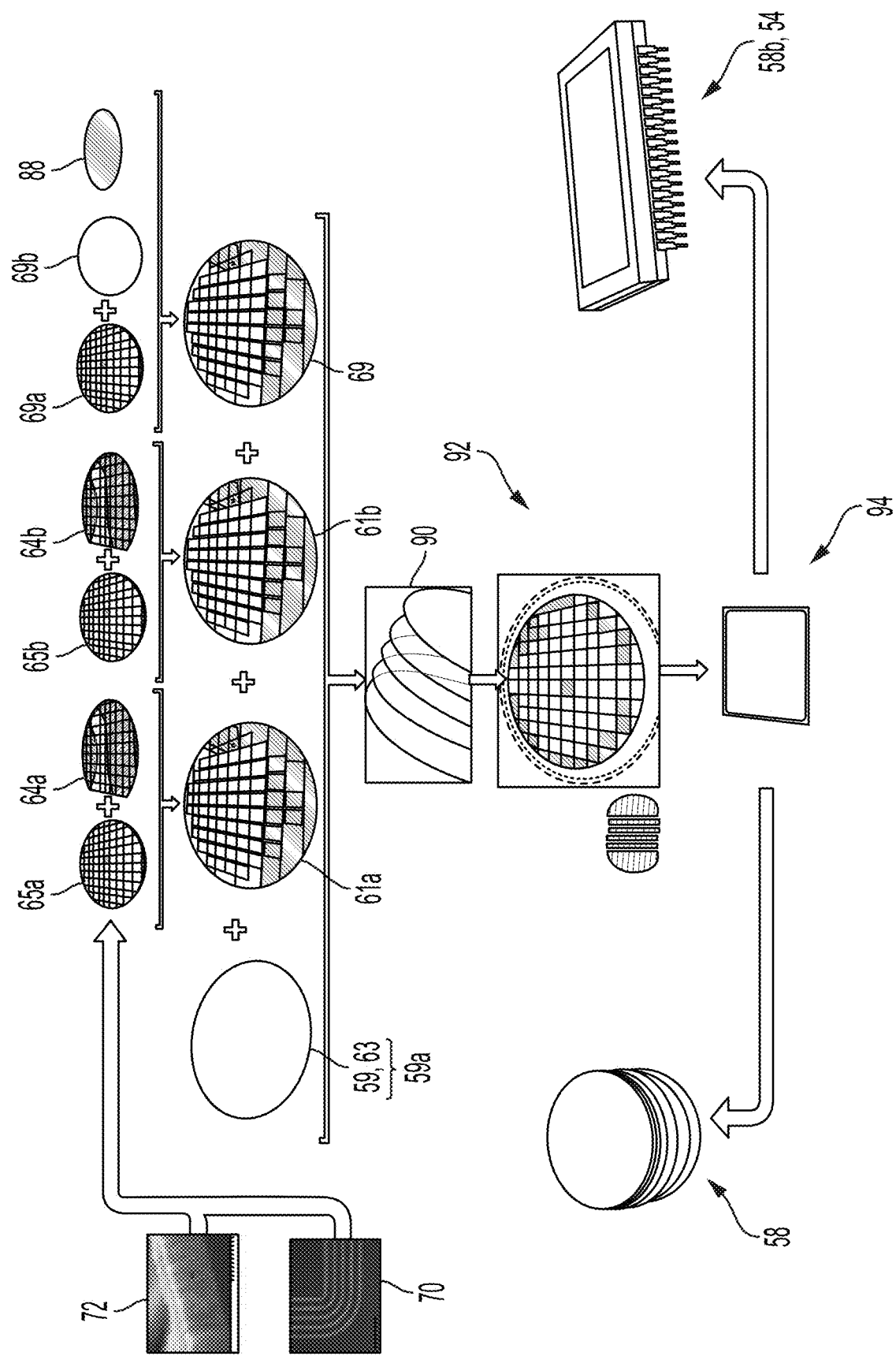
FIG. 8 is a diagram of the method steps used to produce the analog image intensifier tube and, concurrent therewith (if desired), the digital imager comprising with electron multiplication and addressable emission.

Turning now to FIG. 8, a total of 8 wafers are used to create the image intensifier tube. The eight wafers comprise spacer wafer 65*a* bonded to processed silicon wafer 64*a* to form the primary electron multiplier wafer 61*a*. Spacer wafer 65*b* is bonded to processed silicon wafer 64*b* to form the secondary electron multiplier wafer 61*b*. Spacer wafer 69*a* bonded to fiber optic wafer 69*b* to form the sensor anode wafer 69, and the GaAs wafer 63 bonded to faceplate wafer 59 to form the photocathode wafer 59*a*. Phosphor 88 can be applied to either the spacer wafer 69*a* or the fiber optic wafer 69*b* of sensor anode 69. Getter material 72 and seal member 70 is applied to spacer wafers 65*a*, 65*b* and 69*a*.

According to a preferred embodiment, the overall thickness of the bonded spacer and processed silicon wafers, including the faceplate and the fiber optic wafer of the photocathode and anode 59*a* and 69 is considerably thinner than a conventional image intensifier tube. Preferably, the faceplate 59 is between 50-80 mil in thickness. The bonded primary electron multiplier wafer 61*a* is between 3 and 4 mil thick, and the secondary electron multiplier wafer 61*b* is also between 3 and 4 mil in thickness. The bonded fiber optic screen and spacer wafer 69*a*, including the phosphor coating 88 used to form sensor anode 69 is preferably less than 80 mil in thickness. The faceplate can be thinned from conventional faceplates, and various spacers can also be thinned provided there is sufficient structural integrity remaining. Each of the semiconductor wafers can have their backside surfaces thinned before bonding to the corresponding spacer wafers. The spacer wafers are optically transparent glass, and provide vacuum cavities that hold the getter and the seal material. Once sealed, the gaps between the photocathode and the primary electron multiplier, as well as between the primary electron multiplier and the secondary electron multiplier is preferably less than 10 mil in thickness. The gap between the secondary electron multiplier is preferably less than 15 mil. The glass spacer wafers 69*a* is thermal expansion-matched to the fiber optic wafer 59*b* and like all spacer wafers 65*a* and 65*b*, getter and seal members are applied to the ensuing cavity. An atomic layer deposited (ALD) thin filmed phosphor 88 is applied to the spacer wafer 69*a* or the fiber optic wafer 69*b* to provide the highest imaging quality.

Once all the wafers are bonded with the seal member surrounding each individual die, as shown in step 90, the sealed wafers are placed on a vacuum post and diced the full thickness of the combination of the vacuum sealed wafers at step 92. After being diced, individual die are removed as shown by step 94. The combination of faceplate wafers, primary and secondary electron multiplier wafers, and the sensor anode wafer are diced along the seal member arranged along the saw or scribed line in between the faceplate wafer, the primary and secondary electron multipliers and sensor anode wafer to form vacuum sealed cavities there between. The processed components on each of the sealed wafers are therefore aligned with one another and the emission and emitter axis of the primary and second electron multiplier are also photolithography aligned. For example, one resulting die 94 can be sent to the analog imaging channel, and specifically image intensifier tube 58, whereas the other die 94 can be bonded within the digital imager 54 as a second image intensifier tube 58*b*. The bonded image intensifier tube 58*b* can be further molded into a package material with leads extending therefrom, as shown. The analog image intensifier tube 58 is coupled within the analog intensifier channel of the night vision system 52, whereas the packaged image intensifier 58*b* within the digital imager 54 is electrically coupled to sockets with a printed bus 25 coupled to those sockets and extending towards and coupling to electron emitters 78 on both the primary and secondary electron multipliers 61*a* and 61*b*.

Figure 9:
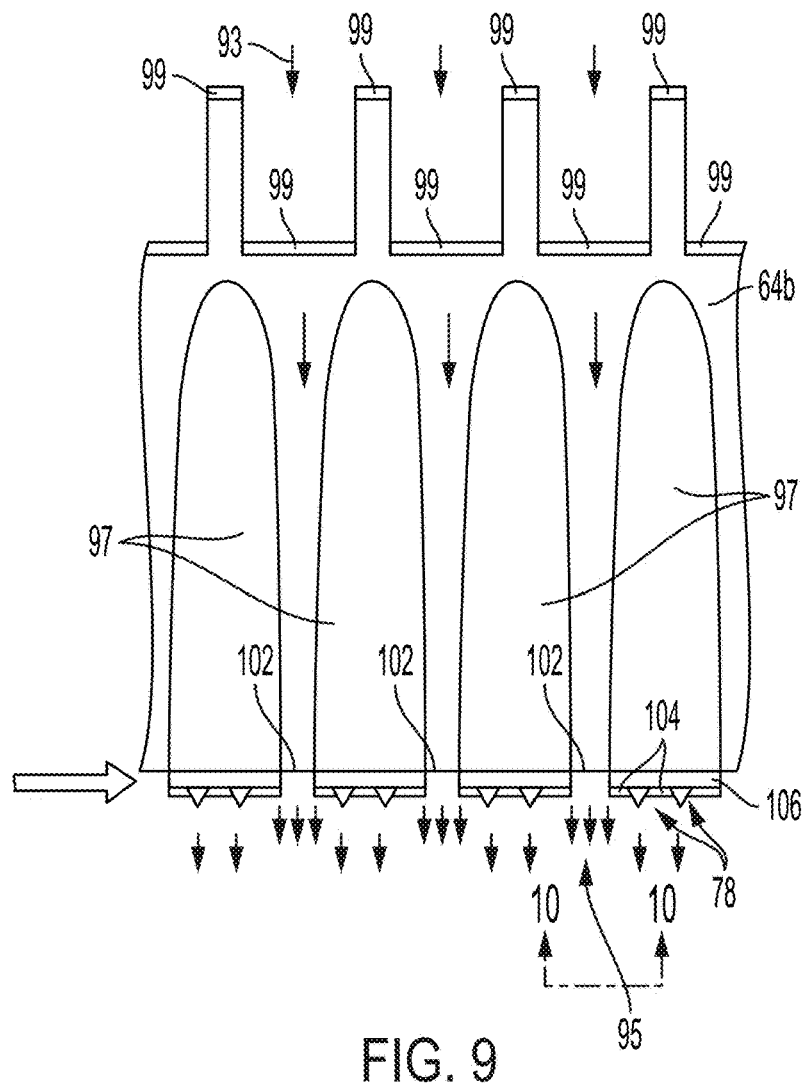
FIG. 9 is a side view within region 9 of FIG. 7, showing placement of the electronically addressable electron emitters interlaced between multiplied electron emission areas of a silicon membrane.

Turning now to FIG. 9, a detailed view along region 9 of FIG. 7 is shown. FIG. 9 illustrates the placement of the electrically addressable electron emitters 78 extending from a backside surface of processed silicon semiconductor die 64*b*. Processed silicon semiconductor die 64*b* multiplies electrons 93 entering the electron multiplier to present gained, multiple electrons 95 produced therefrom. Processed silicon semiconductor die 64*b* includes doped regions 97 that are doped from the backside surface toward the frontside surface, wherein the doped regions do not extend all the way to the frontside surface. Additional doped regions 99 are also formed. The doped regions 99 are doped with boron or aluminum, and constitute a p-type doped material. Doped regions 99 are doped heavily relative to doped regions 97, which are also doped with p-type doping materials. The multiplied electrons 95 are emitted from emission regions 102, which are activated to a negative electron affinity state to facilitate the flow of electrons from the emission regions 102. Shown between emission regions 102 are emitters 78, and specifically Spindt emitter tips that extend as protrusions 78 from the backside surface. The protrusions are conductive and are coupled to gating circuitry 104. The gating circuitry includes various actuators that receive the electrical signals on bus 55 (FIG. 6) turn on or off a corresponding emitter.

The gating circuitry 104 can include printed conductors and deposited multiple conductive regions that are placed on a dielectric, such as oxide 106 to separate those conductive members 104 from doped regions 97. The conductive materials can reduce electron backscattering and reduce any dark current by the ratio of the area blocked by the metallic materials that are deposited. On the frontside surface of the processed silicon substrate die 64*b* are etched recesses that can assist in channeling the electron beam into the appropriate pixel region directly above the electron emission surface 102. The texture frontside surface helps mitigate halo and improves gain at low incident electron energy.

Each protrusion of emitter tips 78 allows addressable electron to be emitted on a pixel-by-pixel basis next to the emission areas thereby making an image independent of the intensified image. The processed silicon semiconductor die 64*b*, or silicon membrane, is lightly p-type doped in regions 97 relative to regions 99. The ensuing product indicates the halo intensity will be reduced by 40× and the size by 2×, making the overall device having a near zero halo. The electron receiving surface that receives electrons 93 is more heavily p-type doped to push the electrons towards the emission surface on the opposite side (backside) of the device. When the electrons impact the front surface, they dissipate their energy creating additional electrons by impact ionization. The noise figure of this amplification is approximately 1.12, much lower than the noise figure of the MCP which ranges from 1.4 to 1.7. The result is an increase in signal-to-noise ratio of 45 compared to 36 for an MCP-type intensifier. The gained electrons diffuse to the emission surface. If the p-type doping profiles were not in place the electrons would diffuse laterally as they move toward emission surface 102. It is the active receiving the electrons 93 on one side, gaining those electrons, then diffusing them to the opposite surface 102 and re-emitting them that gives the present device its name of transmission mode secondary electron (TMSE) intensifier. The doping profiles funnel the electrons to the smaller emissions surface. In a MCP-based intensifier, the hole at the input and output are about the same size so there is no focusing of the electrons. In the TMSE device, the receiving area is larger than the emission area. This helps to improve the modulation transfer function, or image fidelity. In a MCP intensifier, the largest loss in modulation transfer function is the radial energy the electron possess as they leave the back of the MCP. This radial energy, or mean transfer energy, allows the electrons to spread to the vacuum gap between the components. The negative electron affinity surface of the GaAs photocathode, and the silicon gain wafers, have MTE that are an order of magnitude smaller than the MCP. These features, small emission area, doping profiles, low MTE, and front surface texture, lead to a device which will have improved MTF across all the spatial frequencies and have resolution of 90 lp/mm compared to MCP-based intensifiers with resolution of 64 to 81 lp/mm. In the actual TMSE electron multiplier device, there are two silicon gain layers as both primary and secondary electron multipliers to produce the same gain as the MCP-based intensifier. The MTF improvement would allow a 14 mm die size electron multiplier to have the same range recognition as the current 18 mm MCP-based image intensifier. Therefore, the night vision system size can be reduced by the reduction of the image intensifier channel ACW and DCW, and the associate optics.

The resolution of the screen is important for both the image intensified channel and the incorporated screen. The radius that the electrons travel from the initial emissions spot in emissions regions 102 is determined by the mean transverse energy of the emitted electrons. This is the amount of energy that is directed parallel to the surface. The radius is given by:

$$R = 2\text{Gap}\left(\frac{MTE}{V_{bias}}\right)^{\frac{1}{2}}$$

Gap is the distance between the silicon layer containing the emitter tip protrusion 78 and the sensor anode 69. $V_{bias}$ is the voltage between the silicon membrane of the emitter 78 and the sensor anode 69. In the intensifier design, the gap and voltage bias are the same as in the standard intensifier at 375 microns and at 4200 volts. For the negative electron affinity surfaces GaAs and silicon, the MTE are on the order of 0.05 and 0.075 volts respectively. In a case of the field emitter tips of the electron emitters 78, the MTE and a collimated structure is on the order of 0.12 volts. Table 1 shows the projected radius of the three MTE values of negative electron affinity GaAs and negative electron affinity silicon, and the collimated field emission tip.

TABLE 1

| Configuration | MTE (V) | Spot Radius (μm) |
|---|---|---|
| GaAs | 0.05 | 2.58 |
| Silicon | 0.075 | 3.17 |
| Collimated Field Emission | 0.12 | 4.01 |

As shown in the Table 1 above, the spot radius of the field of the electron emitters is on the order of the spot from negative electron affinity GaAs and silicon. The electronically addressable screen will have about the same resolution as the image intensifier. Due to each intensifier pixel having the capability including an addressable field emission electron emitter array, the pixel count will also be the same. The intended pixel size for the intensifier is 6 microns, and the format is 14 mm horizontal and vertical. Thus the array size is 5.4 megapixel. This is in excess of most display requirements currently being specified by military systems. The geometry thus derived is a monochrome display of same color as the normal image intensifier.

Figure 10:
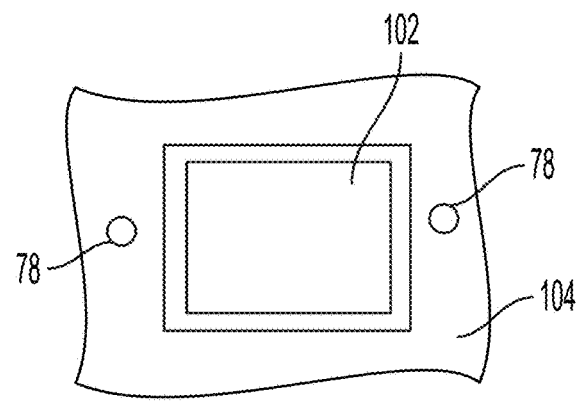
FIG. 10 is a bottom or backside view within region 10 of FIG. 9, showing the electronically addressable electron emitters of an addressable pixel display between multiplied electron emission areas, and also showing areas reserved for control circuitry for receiving electrical signals from the digital imager to addressably actuate the electron emitters.

Turning now to FIG. 10, a bottom backside view within region 10 of FIG. 9 is shown. Specifically FIG. 10 illustrates the multiplied electron emission area 102 spaced between a pair of electron emitters 78. In the region around the emission region 102 is reserved for control circuitry 104 used to actuate the adjacent electron emitter 78 on a pixel-by-pixel base. It is recognized that FIG. 10 shows only a portion of the backside surface of the secondary electron multiplier 64b. It is also recognized that the backside surface of the primary electron multiplier 64a is identical to that of the secondary electron multiplier 64b. As such, a first plurality of spaced emission surfaces 102 on the backside surface of the primary electron multiplier 64a are aligned with and along the same emission axis as the corresponding second plurality spaced emission surfaces 102 on the backside surface of the secondary electron multiplier 64b. The first plurality of spaced emission surfaces 102 are interlaced with the first plurality of spaced electron emitters 78. The second plurality of spaced emission surfaces 102 are interlaced with the second plurality of spaced electron emitters 78. Each of the first plurality of the spaced emission surfaces are aligned with respective ones of the second plurality of spaced emission surfaces along a plurality of emission axes that are parallel to each other and parallel to an inner wall of the vacuum housing. Moreover, the plurality of emitter axes are parallel to and interlaced with the plurality of emission axes.

To create a color display with red green blue (RGB) pixels in a spatial arrangement would reduce the resolution both the image intensifier and the incorporated electronically addressable display on the backside surfaces of the electron multipliers. A color display can be created by temporally splitting a fixed time period, utilizing a white phosphor screen, and adding an external set of electronically tunable color filters. For example, for a time period of 1/30 of a second, split into unequal portions, any pixels that are red will be addressed first, then pixels that are green will be addressed and actuated second, and finally on the third time slice a blue field emission points are actuated and a blue filter activated.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

As used herein, the terms "about," "approximately," "substantially," "generally," and the like mean plus or minus 10% of the stated value or range. In addition, as used herein, the singular forms "a," "an" and "the" are intended to include the plural forms as well, unless the context clearly indicates otherwise. The term "and/or" includes any and all combinations of one or more of the associated listed items. For example, reference to "a feature" includes a plurality of such "features." The term "and/or" used in the context of "X and/or Y" should be interpreted as "X," or "Y," or "X and Y".

The illustrated embodiments described in the detailed description, drawings, and claims are not meant to be limiting. Other embodiments may be used, and other changes may be made, without departing from the spirit or scope of the subject matter presented herein. Additionally, particular aspects of each embodiment may also be used in conjunction with other embodiments of the present disclosure and thus, the disclosed embodiments may be combined as understood in the art. It will be readily understood that the aspects of the present disclosure, as generally described herein, and illustrated in the figures, can be arranged, substituted, combined, separated, and designed in a wide variety of different configurations, all of which are explicitly contemplated herein.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A night vision system, comprising:
an analog image intensifier tube;
an addressable display within the analog image intensifier tube configured to create an electronically addressable output;
a digital imager configured to receive an optical image and produce a plurality of digital electrical signals corresponding to the optical image; and
a controller configured to produce a symbol digital electrical input onto the plurality of digital electrical signals;
wherein the analog image intensifier tube is configured to receive the optical image and to produce multiplied electrons from the addressable display comprising an electron multiplier within the analog image intensifier tube, and to also produce electrons from electron emitters on the electron multiplier that are addressed on a pixel-by-pixel basis by the plurality of digital electrical signals.

2. The night vision system of claim 1, wherein the digital imager comprises:
a second analog image intensifier tube configured to receive the optical image and produce multiplied electrons; and
a digital sensor coupled to receive multiplied electrons from the second analog image intensifier tube and produce the plurality of digital electrical signals.

3. The night vision system of claim 1, wherein the analog image intensifier tube comprises:
   a photocathode;
   a sensor anode;
   the electron multiplier;
   a secondary electron multiplier identical to the electron multiplier, wherein the electron multiplier and the secondary electron multiplier are both spaced facing each other and are both spaced between the photocathode and the sensor anode;
   a voltage source configured to generate an electric field to direct electrons from the photocathode to the sensor anode; and
   a vacuum sealed housing surrounding the photocathode, the anode, the electron multiplier and the secondary electron multiplier.

4. The night vision system of claim 1, wherein the electron multiplier comprises:
   a plurality of doped regions within a silicon substrate; and
   a multiplied electron emission region between a pair of the plurality of doped regions.

5. The night vision system of claim 4, wherein the electron emitters comprise a plurality of spaced conductive protrusions, two of which are spaced by an oxide layer from a respective said pair of doped regions.

6. The night vision system of claim 1, wherein the digital imager and the analog image intensifier tube have identically sized optical field of view channels in both height and width.

7. An image intensifier tube, comprising:
   a photocathode secured in a vacuum sealed housing;
   a primary electron multiplier spaced from the photocathode within the vacuum sealed housing, wherein the primary electron multiplier comprises a backside surface facing away from the photocathode and containing a first plurality of spaced electron emitters dielectrically spaced from respective first plurality of doped regions;
   a secondary electron multiplier spaced from the primary electron multiplier within the vacuum sealed housing, wherein the secondary electron multiplier comprises a backside surface facing away from the primary electron multiplier and containing a second plurality of spaced electron emitters dielectrically spaced from respective second plurality of doped regions; and
   a sensor anode secured in the vacuum housing.

8. The image intensifier tube of claim 7, wherein the first plurality of doped regions extend within a first silicon substrate from the backside surface of the primary electron multiplier toward but not to an opposed frontside surface of the primary electron multiplier, and wherein the second plurality of doped regions extend within a second silicon substrate from the backside surface of the secondary electron multiplier toward but not to an opposed frontside surface of the secondary electron multiplier.

9. The image intensifier tube of claim 8, wherein the frontsides of the primary electron multiplier and the secondary electron multiplier comprise a spaced plurality of protrusions that are doped with the same dopant type as the first and second plurality of doped region and of greater dopant concentration than the first and second plurality of doped regions.

10. The image intensifier tube of claim 7, further comprising:
    a first electrical connection to each of the first plurality of spaced electron emitters;
    a second electrical connection to each of the second plurality of spaced electron emitters; wherein the first and second electrical connections concurrently and simultaneously receive the same plurality of electrical signals to address respective first and second plurality of electron emitters; and
    wherein each of the first plurality of electron emitters are aligned with a respective one of the second plurality of electron emitters along a plurality of emitter axes that are parallel to each other and parallel to an inner wall of the vacuum housing.

11. The image intensifier tube of claim 10, further comprising:
    a first plurality of spaced emission surfaces on the backside surface of the primary electron multiplier from which multiplied electrons are produced from the primary electron multiplier;
    a second plurality of spaced emission surfaces on the backside surface of the secondary electron multiplier from which multiplied electrons are produced from the secondary electron multiplier;
    wherein the first plurality of spaced emission surfaces are interlaced with the first plurality of spaced electron emitters;
    wherein the second plurality of spaced emission surfaces are interlaced with the second plurality of spaced electron emitters; and
    wherein each of first plurality of spaced emission surfaces are aligned with a respective one of the second plurality of spaced emission surfaces along a plurality of emission axes that are parallel to each other and parallel to an inner wall of the vacuum housing.

12. The image intensifier tube of claim 11, wherein the plurality of emitter axes are parallel to and interlaced with the plurality of emission axis.

13. The image intensifier tube of claim 7, further comprises:
    a seal member adjacent to the vacuum housing between the primary electron multiplier and the secondary electron multiplier; and
    a getter member adjacent to the seal member.

* * * * *